US012595690B2

(12) United States Patent
Klocke

(10) Patent No.: US 12,595,690 B2
(45) Date of Patent: Apr. 7, 2026

(54) POSITIONING DEVICE FOR A MOTOR VEHICLE DOOR

(71) Applicant: KIEKERT AKTIENGESELLSCHAFT, Heiligenhaus (DE)

(72) Inventor: Tobias Klocke, Solingen (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 0 days.

(21) Appl. No.: 18/840,212

(22) PCT Filed: Jan. 23, 2023

(86) PCT No.: PCT/DE2023/100047
§ 371 (c)(1),
(2) Date: Aug. 21, 2024

(87) PCT Pub. No.: WO2023/169620
PCT Pub. Date: Sep. 14, 2023

(65) Prior Publication Data

US 2025/0163733 A1 May 22, 2025

(30) Foreign Application Priority Data

Mar. 8, 2022 (DE) ..................... 10 2022 105 329.6

(51) Int. Cl.
*E05B 81/20* (2014.01)
*E05B 79/20* (2014.01)
(Continued)

(52) U.S. Cl.
CPC .............. *E05B 81/20* (2013.01); *E05B 79/20* (2013.01); *E05B 81/04* (2013.01); *E05B 81/56* (2013.01); *E05B 81/64* (2013.01)

(58) Field of Classification Search
CPC .......... E05B 81/20; E05B 79/20; E05B 81/04; E05B 81/56; E05B 81/64; E05B 81/06; E05B 81/76; E05C 17/003
See application file for complete search history.

(56) References Cited

U.S. PATENT DOCUMENTS

| | | | | |
|---|---|---|---|---|
| 12,173,546 | B2 * | 12/2024 | Reddmann | E05F 15/619 |
| 2021/0222464 | A1 | 7/2021 | Oxley | |
| 2021/0317688 | A1 * | 10/2021 | Drost | E05B 77/54 |

FOREIGN PATENT DOCUMENTS

| | | | |
|---|---|---|---|
| DE | 102007062472 | B4 | 7/2013 |
| DE | 102016105760 | A1 | 10/2017 |

(Continued)

OTHER PUBLICATIONS

International Search Report mailed Apr. 18, 2023, for priority International Application No. PCT/DE2023/100047.

*Primary Examiner* — Kristina R Fulton
*Assistant Examiner* — Thomas L Neubauer
(74) *Attorney, Agent, or Firm* — Renner, Otto, Boisselle & Sklar, LLP

(57) ABSTRACT

A positioning device for a motor vehicle door, which is provided in its basic design with an electric motor drive for a positioning element, furthermore with at least one sensor assigned to the positioning element, and with a movement element optionally securing or releasing the positioning element (1, 2) and/or the motor vehicle door. The sensor is capable at least of measuring a force engaging on the positioning element. According to the invention, the movement element can be acted upon at least independently of the operator in accordance with signals from the sensor.

17 Claims, 3 Drawing Sheets

(51) Int. Cl.

| | |
|---|---|
| ***E05B 81/04*** | (2014.01) |
| ***E05B 81/56*** | (2014.01) |
| ***E05B 81/64*** | (2014.01) |

(56) References Cited

FOREIGN PATENT DOCUMENTS

| | | | |
|---|---|---|---|
| DE | 102018132665 | A1 | 6/2020 |
| DE | 102018132666 | A1 | 6/2020 |
| DE | 102019115304 | A1 | 9/2020 |
| WO | 2018002158 | A1 | 1/2018 |

* cited by examiner

POSITIONING DEVICE FOR A MOTOR VEHICLE DOOR

This application is a national phase of International Patent Application No. PCT/DE2023/100047 filed Jan. 23, 2023, which claims priority to German Patent Application No. 10 2022 105 329.6 filed Mar. 8, 2022, each of which is hereby incorporated herein by reference in its entirety.

FIELD OF DISCLOSURE

The invention relates to a positioning device for a motor vehicle door, with an electric motor drive for a positioning element, furthermore with at least one sensor assigned to the positioning element, which is capable at least of measuring a force engaging on the positioning element, and with a movement element which optionally acts on the positioning element and/or the motor vehicle door.

BACKGROUND OF DISCLOSURE

For aerodynamic reasons, attempts are increasingly being made to design motor vehicles, and in particular their motor vehicle doors, without a door handle for opening from the outside. In order to be able to open the motor vehicle door, such positioning devices are provided. By means of the positioning device, the motor vehicle door is opened after a possible prior question/answer dialog between the operator and the motor vehicle, and possibly a prior unlocking. This corresponds to an opening between the motor vehicle door and an associated motor vehicle body.

By means of this opening, it is possible for the operator, wishing to enter, to grasp the motor vehicle door and swing it open after the positioning process, for example. This makes the interior of the motor vehicle accessible.

In a positioning device for a motor vehicle door, as described in DE 10 2016 105 760 A1, a first sensor is provided which is assigned to a drive element and which can at least distinguish between a positioning process and a manual opening process of the motor vehicle door. This is intended to provide a low weight while also providing improved comfort.

The further prior art according to DE 10 2018 132 666 A1 provides that a force measuring device is accommodated in a positioning device in such a way that a movement of a gear carrier can be detected. The gear carrier represents a component of a gear unit which belongs to the electric motor drive and is arranged between the positioning element and the electric motor drive.

The generic prior art according to DE 2018 132 665 A1 proceeds from a positioning device in such a way that a gear unit is adjustably arranged between a positioning element and the electric motor drive, so that the associated motor vehicle door can be moved. In addition, the motor vehicle door can be held in place using the positioning element. For this purpose, a locking means and in particular a locking lever is additionally provided. The locking means and/or the locking lever can be controlled electronically, in particular by means of the electric motor drive. The sensor can be used to detect a force acting on the positioning device. The procedure here is, for example, that the pulling force of an operator is detected by means of the sensor and this initiates the unlocking of the locking means and/or locking lever.

The primary purpose of the locking means and/or locking lever is to enable a closing movement by means of the positioning device. This means that the positioning device can work as a combined positioning and closing device. In this context, the sensor ultimately takes on a securing function, such that the locking can be stopped, prevented or cancelled if excessive forces occur. This prevents any damage to the positioning device.

The prior art has proven itself in principle, but still offers room for improvement. The general problem with such positioning devices is that forces acting on them from the outside and/or on the motor vehicle door cannot be controlled or can only be controlled to a very limited extent. These external forces can, for example, be wind hitting the motor vehicle door. In practice, however, other requirements arise, predominantly such that the motor vehicle is parked with the motor vehicle door on an uphill or downhill road portion. In this case, there is a possibility that, after the motor vehicle door has been opened, the positioning device cannot prevent the motor vehicle door from opening independently, for example as a result of the acting downhill slope force. In any case, the prior art does not yet provide any convincing solutions for controlling the independent opening of the motor vehicle door, in particular after a positioning process. The invention as a whole seeks to remedy this.

SUMMARY OF DISCLOSURE

The invention is based on the technical problem of further developing such a positioning device in such a way that, in particular, independent opening processes of the motor vehicle door following a positioning process are controlled.

To solve this technical problem, the invention proposes, in a generic positioning device, that the movement element can be or is acted upon at least independently of the operator in accordance with signals from the sensor.

Within the scope of the invention, the movement element is initially acted upon independently of an operator or the intervention of an operator. This means that the action on the movement element occurs predominantly and at least independently of the operator. The movement element is acted upon in accordance with signals from the sensor.

If the sensor assigned to the positioning element registers a low or even decreasing force during the positioning process using the electric motor drive, for example, this indicates that the motor vehicle door, moved using the positioning device, is additionally subjected to external forces. These external forces can be, for example, a gust of wind or gravitational forces that act on the motor vehicle door when the vehicle is parked on a slope, for example.

In order to be able to determine such an external force that additionally acts on the motor vehicle door or an associated motor vehicle door leaf, the invention generally proceeds in such a way that a time-dependent force curve, for example, is stored as a target force for acting on the positioning element in a control unit that is already provided anyway for acting on the electric motor drive and also for reading the sensor. This time-dependent force curve can be an averaged force curve which has previously been recorded or determined, for example, by operating the positioning device multiple times in a motor vehicle located on a level surface, and then recording each curve of the force detected by the sensor over time and then averaging it. Of course, it is also possible to store such a force curve averaged or standardized over time in the control unit from the outset, based on previously determined values. This target force is compared with the measured actual force to determine any deviations. If the actual force is below the target force, this indicates additional forces acting on the motor vehicle door (and acting in the opening direction).

In addition, it is also possible to simply measure the actual force acting on the positioning element and determined using the sensor (independent of time) and compare it with the target force stored in the control unit. This target force represents a maximum force that occurs when the positioning element is acted upon when the motor vehicle is on a level surface. As soon as the measured actual force falls below this target force, this indicates that additional external forces are acting on the motor vehicle door or its motor vehicle door leaf, for example in the form of wind or as a result of gravity.

The target force, which is stored in the control unit and is compared with the actual force acting on the sensor, can also simply be embodied as an average force acting on the positioning element (and not as a maximum force as before), which is then observed when the motor vehicle is on a level surface and no additional force acts on the motor vehicle door as a result of, for example, wind. In the same way, a corresponding target force curve over time can be defined and stored in the control unit.

In all cases, the target force or the target force curve over time is compared with the actual force actually acting on the positioning element or the actual force curve over time. As soon as the comparison at this point shows that the actual force or the actual force curve over time indicates that an additional external force is acting on the door leaf of the motor vehicle door, the control unit ensures that the movement element is acted upon.

The action on the movement element as a result of an external force acting on the motor vehicle door corresponds to the movement element holding the positioning element and/or the motor vehicle door in place. In this way, the invention ensures that following a positioning process using the positioning device according to the invention, the positioned motor vehicle door cannot swing open in an uncontrolled manner. This prevents any damage to the motor vehicle door as well as, for example, accident situations in which the motor vehicle door in question swings open onto a cycle path, for example, and a cyclist could collide with the motor vehicle door in question. All of this is prevented according to the invention in that, when an external force acts on the motor vehicle door, and taking into account the risk of unintentional complete opening, the movement element comes into play and ensures that the positioning element and/or the motor vehicle door is held in place by means of the movement element. These are the main advantages.

In detail, the movement element can act on a locking pin or locking bracket, which is generally located on the associated motor vehicle door. However, it is also possible for the movement element to engage around a further hook or recess in the motor vehicle door, and thus ensure that the motor vehicle door cannot swing open uncontrollably.

Since the previously mentioned target force and/or the target force curve over time is stored in the control unit, there is also the possibility of not only preventing the motor vehicle door from opening automatically when an external force acts on the motor vehicle door, but also ensuring that the actual force acting on the motor vehicle door or the actual force curve over time is ultimately "below" the target force or the target force curve over time. Instead, there is the additional possibility that, when the movement element is held in place, an additional external force acting on it can be determined using the sensor assigned to the positioning element, which can be traced back to an operator who wants to open the motor vehicle door, for example. This additional force can now be used to ensure that the control unit deactivates the movement element or ensures that the movement element releases the positioning element and/or the motor vehicle door.

This means that the control unit acts on the deactivated movement element in accordance with signals from the sensor and when an additional external force occurs, to hold the positioning element and/or the motor vehicle door in place. In this case, the action on the deactivated movement element corresponds to the fact that the positioning element and/or the motor vehicle door are held in place. At the same time, the design is such that the control unit acts on the activated movement element in accordance with signals from the sensor, and again when an additional external force occurs, to release the positioning element or motor vehicle door. In this case, the positioning process itself is finished, and the movement element is activated. If external signals of an acting force that can be detected using the sensor are then detected when the motor vehicle door is positioned, and the movement element is activated, the control unit interprets this as corresponding to an operator's request, for example to swing the motor vehicle door completely open. This opening request is then interpreted and implemented by the control unit when the movement element is activated, and in accordance with signals from the sensor, so that the movement element releases the positioning element and/or the motor vehicle door.

Of course, this is only necessary if the movement element has been activated beforehand and has held the positioning element and/or motor vehicle door in place. Such an approach is usually coupled to the additional external force that occurs.

Furthermore, within the scope of the invention, this is done independently of the operator. In principle, the movement element can also be acted upon both independently of the operator and dependently of the operator.

If the catch element is acted upon in an operator-dependent manner, it is conceivable that the movement element is used by an operator to lock the motor vehicle door. In this context, it is also conceivable that the activated movement element is or can be released, in the manner of an emergency release.

According to an advantageous embodiment, the sensor can be assigned to the electric motor drive. It has proven to be particularly advantageous if the sensor is integrated into the electric motor drive. Such an integration can be advantageously implemented by using the sensor to measure the electrical current consumed by the electric motor as part of the electric motor drive. In principle, no separate and additional sensor is necessary for this purpose; rather, the curve of electrical current and current consumed by the electric motor can be detected over time.

In general, however, the sensor is designed to measure a force on the output side generated by the electric motor drive. In this context, the sensor can be designed as a force sensor. In this case, the sensor is a force sensor assigned to a Bowden cable of the drive.

In order to be able to act on the movement element, for example to transfer it from its activated holding state to the deactivated releasing state and vice versa, the electric motor drive can work on the movement element. In general, however, the movement element is equipped with its own electric motor drive. This electric motor drive can be acted upon in accordance with signals from the sensor using the control unit. This means that the control unit not only reads the sensor and, in accordance with this, activates the electric motor drive for the positioning element; also, by means of the control unit, the electric motor drive for the movement element can also be controlled and acted upon in accordance with signals from the sensor.

According to a further advantageous embodiment, the design is such that the movement element and the associated electric motor drive together are designed as a technologically independent catch module. This means that this catch module can, for example, be equipped with its own housing and, as a technologically independent unit, can be optionally combined with the positioning device according to the invention, or not. In addition, it is possible to design the positioning device completely independently and separately from a motor vehicle lock and in particular a motor vehicle door lock, which is usually provided additionally.

According to an advantageous embodiment, the subject matter of the invention is additionally a motor vehicle lock and in particular a motor vehicle door lock which is equipped with the previously described positioning device. In this case, the positioning device is therefore integrated into the motor vehicle lock in question. This makes it possible for the electric motor drive for the positioning element to also preferably be designed as a closing drive for a locking mechanism that is necessary anyway. The locking mechanism in this case is typically composed of a rotary catch and a pawl.

This means that in this case the electric motor drive not only supplies the load to the positioning element and carries out the positioning process already described; in addition, the electric motor drive can also work as a closing drive on the locking mechanism and ensure that it can be moved from a pre-locking position to a main locking position, for example.

As a result, a positioning device is provided which, in a strikingly simple manner, prevents an associated motor vehicle door from opening automatically due to external forces. Such external forces result in the movement element being acted upon independently of any intervention by an operator in accordance with signals from the sensor, by means of the movement element. In this case, the movement element actually ensures that the positioning element and/or the motor vehicle door is held in place. This can prevent any damage to the motor vehicle door or its involvement in an accident. These are the main advantages.

BRIEF DESCRIPTION OF DRAWINGS

The invention is explained in greater detail below with reference to drawings which show only one exemplary embodiment. In the drawings.

DETAILED DESCRIPTION

Figure 1:
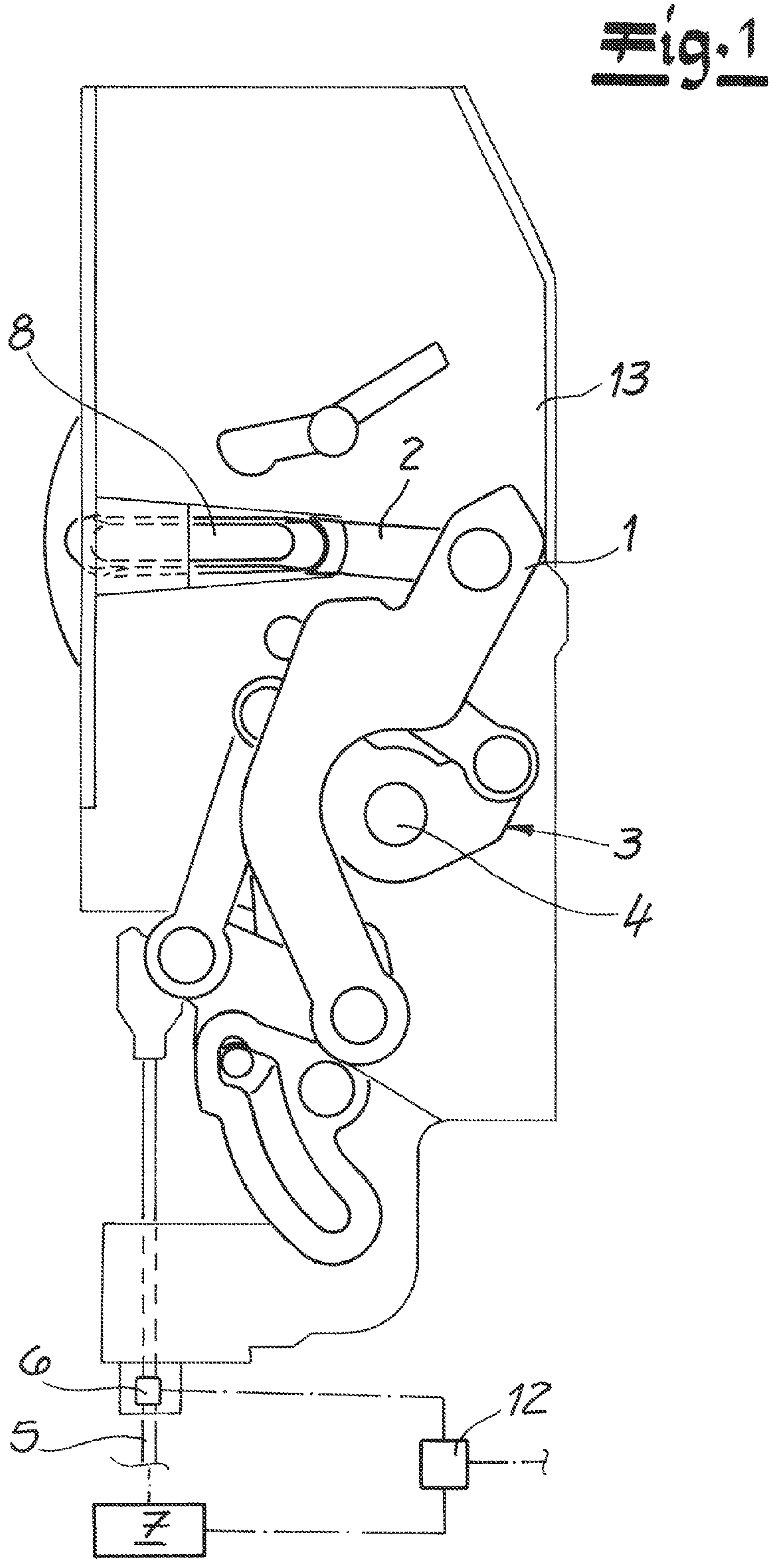
FIG. 1 shows the positioning device according to the invention in conjunction with an associated motor vehicle lock in a first functional position/before the positioning process.
Figure 2:
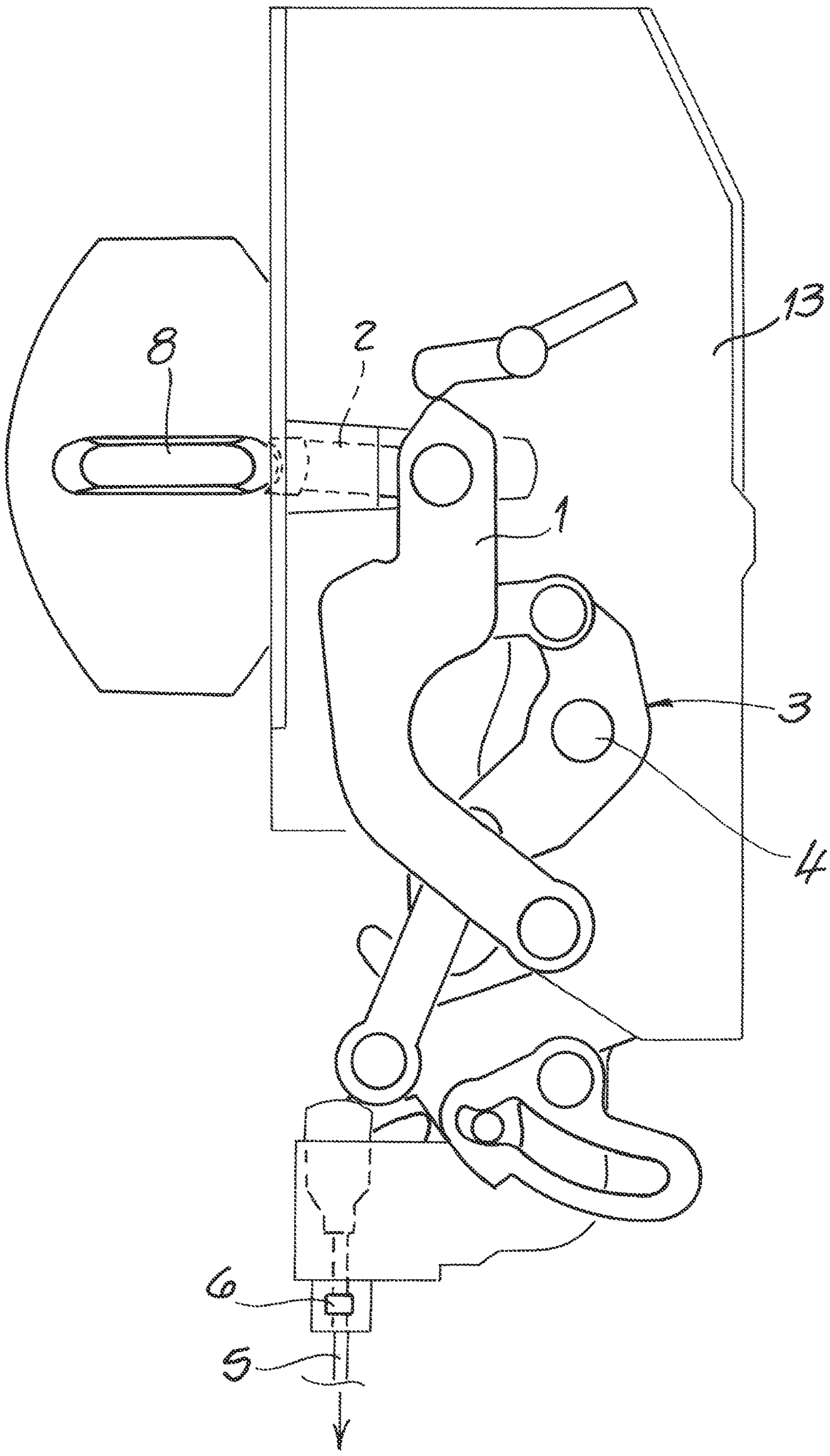
FIG. 2 shows the motor vehicle lock according to FIG. 1 including the positioning device after completion of a positioning process.

The figures show a positioning device for a motor vehicle door (not shown in detail). In fact, all that can be seen on the motor vehicle door in question is a locking pin 8, which can be seen in particular in FIG. 2. The locking pin 8 is connected to a front wall of the motor vehicle door in question and interacts with a locking mechanism (also not shown in detail) consisting substantially of a rotary catch and a pawl of a motor vehicle lock, into which the positioning device is integrated. The closed state of the motor vehicle door corresponds to the locking pin 8 being completely or almost completely retracted into the motor vehicle lock, as shown in FIG. 1. In contrast, FIG. 2 shows a functional position in which the locking pin 8 and thus the motor vehicle door have been positioned. In the case described, the locking pin 8 is provided on the door side, and the motor vehicle lock is provided on the body side. Of course, this can also be reversed.

The positioning device according to the invention is used to position the locking pin 8. For this purpose, it has a positioning element 1, 2. The positioning element 1, 2 is composed of a positioning lever 1 on the one hand and a positioning slider 2 connected to it on the other hand. Due to the combinatorial effect of the positioning lever 1 in conjunction with the positioning slider 2, the locking pin 8 can be moved from its retracted position shown in FIG. 1 into a positioned state shown in FIG. 2 during a positioning process. As a result, an opening is observed between the motor vehicle door and a motor vehicle body, which can be reached into by an operator following the positioning process in order to be able to fully open the motor vehicle door.

The positioning element 1, 2 is acted upon by means of a toggle lever arrangement 3, which is pivotably mounted about an axis 4 and is acted upon by means of an electric motor drive 7. For this purpose, the electric motor drive 7 acts on a Bowden cable 5. Furthermore, it can be seen from the figures that a sensor 6 is provided.

In the exemplary embodiment, the sensor 6 is a force sensor 6 which is assigned to the Bowden cable 5. In fact, the Bowden cable 5 is connected via a force sensor 6 to the electric motor drive 7.

Consequently, if the electric motor drive 7 acts on the toggle lever arrangement 3 via the Bowden cable 5 in such a way that the latter is pivoted about its axis 4, in order to then act on the positioning element 1, 2, the forces acting on the Bowden cable 5 and applied by the electric motor drive can be measured with the aid of the sensor 6. To open the motor vehicle door, the toggle lever arrangement is pivoted counterclockwise about its axis 4.

Figure 3:
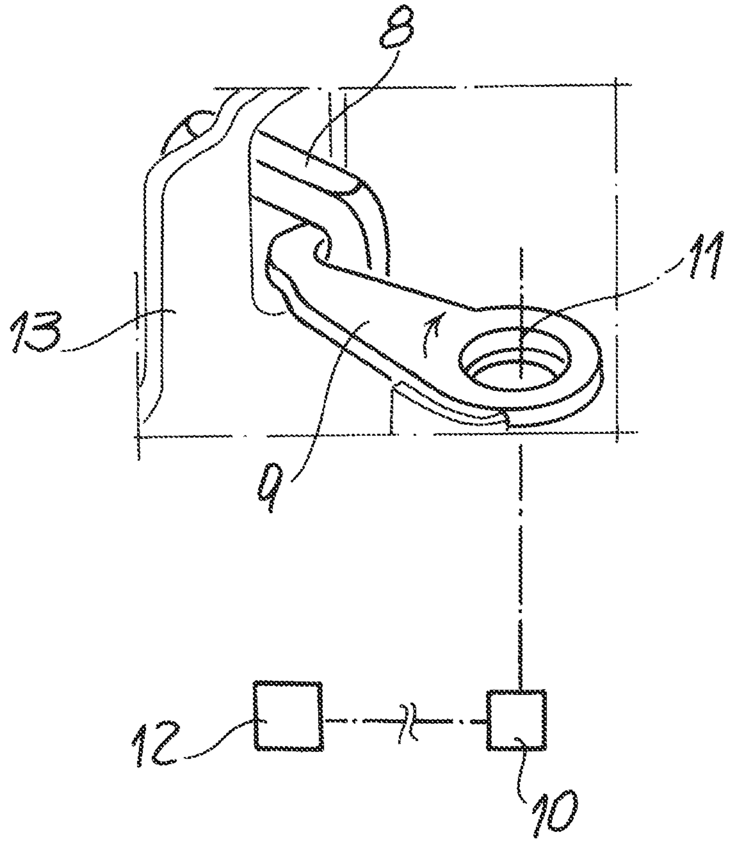
FIG. 3 shows a further view of the subject matter according to FIGS. 1 and 2, with the movement element visible in the figure.

When comparing FIGS. 1, 2 and 3, it becomes clear that an additional movement element 9 is provided. By means of the movement element, the positioning element 1, 2 and/or the motor vehicle door can be optionally held or released. For this purpose, according to the exemplary embodiment, the movement element 9 is designed—without being limited thereto—as a catch hook 9. The catch hook 9 can optionally hold the locking pin 8 in the activated state or release it in the deactivated state. For this purpose, the catch hook 9 is equipped with its own electric motor drive 10. The electric motor drive 10 ensures that the catch hook 9 can be pivoted about its axis 11 as shown in FIG. 3. In principle, the catch hook 9 can also be designed differently. That is, within the scope of the invention, a catch element 9 generally ensures that the locking pin 8 is optionally held or released.

For this purpose, the catch element or the catch hook 9 and/or its associated electric motor drive 10 is connected to a control unit 12. The same applies to the sensor and/or force sensor 6 and the electric motor drive 7 for actuating the positioning element 1, 2.

In this way, the sensor and/or force sensor 6 is basically able to act on the catch element 9—and/or act on the catch element 9 in accordance with its signals—independently of the operator. This means that, as soon as an external force acting on the motor vehicle door is determined by means of the sensor and/or force sensor 6 by means of the control unit 12, the control unit 12 ensures that the catch hook 9 is acted upon via the electric motor drive 10.

Specifically, this means, starting from the closed state of the motor vehicle lock and consequently at the beginning of the positioning process, that the electric motor drive 7 acts on the positioning element 1, 2 in such a way that the locking pin 8 moves to the left from its position in FIG. 1 during the transition to FIG. 2. During this process, the force exerted by the electric motor drive 7 via the Bowden cable 5 on the positioning element 1, 2 is measured by means of the sensor and/or force sensor 6. If this measurement of the force at sensor 6 shows that this measured actual force is, for example, below or at a target force stored in the control unit 12, as already described in the introduction, this indicates that an additional external force is acting on the motor vehicle door. This can be caused, for example, by gravitational forces caused by parking the associated motor vehicle on a slope.

This then leads, according to the invention, to the catch element 9 being acted upon after completion of the positioning process or after the locking pin 8 has traveled a positioning path, as shown in FIG. 2. According to the exemplary embodiment, this is done completely independently of the operator and in accordance with signals from the sensor 6.

In fact, starting from the beginning of the positioning process and from the closed state of the motor vehicle door, the catch element 9 is in its deactivated position as shown in FIG. 1. This corresponds to the fact that the catch element 9 does not hold or engage with the locking pin 8. As soon as the positioning process has been finished and the functional position according to FIG. 2 has been reached, the separate electric motor drive 10 assigned to the catch element 9 ensures that the catch element 9 is moved from its previously-assumed deactivated position or position releasing the locking pin 8 into a position holding the locking pin 8 when external forces act. This corresponds, in accordance with the illustration in FIG. 3, to a pivoting movement of the catch element and/or catch hook 9 about the axis 11 in a clockwise direction.

As mentioned above, this only happens when, with the aid of the sensor 6, an additional external force acts on the positioning element 1, 2, which acts in addition to the force generated by the electric motor drive 7 on the positioning element 1, 2.

If the locking pin 8 and thus the positioning device and/or the associated motor vehicle door are now in their positioned state and the positioning process is finished, as shown in FIG. 2, a force acting on the locking pin 8 can again be measured by means of the control unit 12 using the sensor and/or force sensor 6. This state can be reported to the control unit 12, for example, by means of a travel sensor of the motor vehicle door. In such a case, and with the catch element 9 activated, this force may correspond to an operator attempting to open the motor vehicle door held in place by the catch element 9. Such a force application then leads, when the catch element 9 is activated or holds the locking pin 8, to the electric motor drive 10, with the aid of the control unit 12, acting on the catch element and/or the catch hook 9 in such a way that, in the illustration according to FIG. 3, it performs a counterclockwise movement about its axis 11. This corresponds to the locking pin 8 being released. During this process and after completion of the positioning process, the electric motor drive 7 is not in operation. Nevertheless, the sensor 6, which is practically interposed between the electric motor drive 7 and the Bowden cable 5, ensures that, in the case described, forces acting on the locking pin 8 or the motor vehicle door can be measured by means of the sensor 6. These forces are interpreted and evaluated by the control unit 12 such that the catch element or catch hook 9 releases the locking pin 8.

The catch element or the catch hook 9 and the associated electric motor drive 10 can be designed as a technologically independent catch module 9, 10. In this context, the catch module 9, 10 may have its own housing. Furthermore, it is within the scope of the invention if the positioning device is designed to be completely independent and detached from the motor vehicle lock. This means that the variant shown in the exemplary embodiment with the motor vehicle lock and integrated positioning device is only an option. By integrating the positioning device into the motor vehicle lock, it is possible for the electric motor drive 7 for the positioning element 1, 2 to be used preferably and at the same time as a closing drive for a locking mechanism (not shown in detail and/or already mentioned above). In this case, the electric motor drive 7 ensures that the locking mechanism consisting of the rotary catch and the pawl is closed in a working direction and/or direction of rotation. For this purpose, the electric motor drive 7 may act on the rotary catch directly or indirectly.

In this context, the electric motor drive 7 can be equipped with an (integrated) clutch (not expressly shown). This makes it possible to switch between the function as a closing drive on the one hand and as an opening drive on the other. The control unit 12 may be used for this purpose. In principle, the catch hook 9 can also be used for the closing function of the electric motor drive 7. In any case, there is the particular advantage that the sensor 6 and/or force sensor 6 can be used both when closing and when opening, in order to be able to determine the force applied and acting on the associated motor vehicle door with the aid of the control unit 12. In addition, the electric motor drive 7 is used in both cases.

In the other working direction and/or direction of rotation, the electric motor drive 7 can then act on the positioning element 1, 2 when the locking mechanism is open. For this purpose, the clutch, for example controlled by the control unit 12, may ensure a previous, corresponding action in the other working direction.

The positioning element 1, 2 and also the catch element or the catch hook 9 can be arranged relative to each other in parallel, spaced apart planes, namely parallel to a lock case 13 in which the locking mechanism (not expressly shown) and also the positioning device as a whole are mounted. However, it is also possible to install the positioning element 1, 2 and the catch element 9 on different sides of the lock case 13, again in parallel planes. The only decisive factor is the fact that both the positioning slider 2 as a component of the positioning element 1, 2 and the catch element and/or the catch hook 9 can interact with the locking pin 8 in the manner described.

LIST OF REFERENCE SIGNS actuating lever 1
positioning element 1, 2
positioning slider 2
toggle lever arrangement 3
axis 4
Bowden cable 5
sensor/force sensor 6
drive 7 locking pin 8
catch hook/catch element 9
catch module 9, 10
drive 10
axis 11
control unit 12

The invention claimed is:

1. A positioning device for a motor vehicle door, the positioning device comprising:

a positioning element for positioning a locking pin of the motor vehicle door, an electric motor drive that drives the positioning element, at least one sensor assigned to the positioning element that measures a force applied by the electric motor drive that is acting on the positioning element, and a movement element which selectively acts on and the locking pin of the motor vehicle door to either release or hold in place the positioning element and the motor vehicle door, wherein the movement element is acted upon at least independently of an operator action in accordance with signals from the sensor, wherein when the measured force acting on the positioning element is above a threshold target force amount, the movement element is spaced from locking pin, and wherein when the measured force acting on the positioning element is at or below the threshold target force amount, the movement element is actuated to engage the locking pin to hold in place the positioning element and the motor vehicle door.

2. The positioning device according to claim 1, wherein the movement element is acted upon both independently of the operator and dependently of the operator.

3. The positioning device according to claim 1, wherein the at least one sensor is assigned to the electric motor drive.

4. The positioning device according to claim 3, wherein the at least one sensor is integrated into the electric motor drive, and measures an electric current consumed by the electric motor drive.

5. The positioning device according to claim 3, wherein the at least one sensor is a force sensor measures a force on an output side generated by the electric motor drive.

6. The positioning device according to claim 5, wherein the at least one sensor is a force sensor assigned to a Bowden cable of the electric motor drive.

7. The positioning device according to claim 1, further comprising a control unit, wherein the control unit is configured to act on the electric motor drive and also reads the at least one sensor.

8. The motor vehicle lock according to claim 7, wherein:

the control unit stores a force curve for the positioning element that includes the threshold target force amount on the positioning element, the control unit is configured to compare an actual force on the positioning element to the threshold target force amount to determine whether an external force is acting on the positioning element, and the control unit acts on the electric motor drive based on the comparison to drive the movement element to engage the locking pin to hold the motor vehicle door in place when the external force is acting on the positioning element.

9. The motor vehicle lock according to claim 8, wherein the control unit further is configured based on signals from the at least one sensor to actuate the movement element to separate the movement element from the locking pin to permit the operator to open the motor vehicle door.

10. The motor vehicle lock according to claim 8, wherein the force curve is a time dependent force curve.

11. The motor vehicle lock according to claim 8, further comprising a second electric motor drive that drives the movement element and the control unit drives the second electric motor drive to act on the movement element, wherein the second electric motor drive is different from the electric motor drive that drives the positioning element.

12. A motor vehicle lock comprising a positioning device according to claim 8 and a locking mechanism, wherein the electric motor drive for the positioning element is simultaneously configured to act as a closing drive for the locking mechanism.

13. The positioning device according to claim 7, wherein the movement element is equipped with its own electric motor drive, which is acted upon by the control unit in accordance with signals from the sensor.

14. The positioning device according to claim 13, wherein the movement element with its own electric motor drive is designed as a technologically independent catch module.

15. A motor vehicle lock comprising a positioning device according to claim 1 and a locking mechanism, wherein the electric motor drive for the positioning element is simultaneously configured to act as a closing drive for the locking mechanism.

16. The motor vehicle lock according to claim 1, wherein the movement element comprises a catch hook that interacts with the locking pin of the motor vehicle door.

17. The motor vehicle lock according to claim 1, wherein the positioning element comprises a positioning lever and a positioning slider, wherein the positioning lever moves the positioning slider.

* * * * *